US008800585B2

(12) United States Patent
Jarrell et al.

(10) Patent No.: US 8,800,585 B2
(45) Date of Patent: Aug. 12, 2014

(54) HIGH RATE DISCHARGE (HRD) VALVE INCORPORATING A ROTATING LEVER RELEASE MECHANISM

(75) Inventors: Joseph R. Jarrell, Sims, NC (US); Clifton Ray Jones, Kenly, NC (US)

(73) Assignee: Kidde Technologies, Inc., Wilson, NC (US)

( * ) Notice: Subject to any disclaimer, the term of this patent is extended or adjusted under 35 U.S.C. 154(b) by 225 days.

(21) Appl. No.: 13/314,863

(22) Filed: Dec. 8, 2011

(65) Prior Publication Data
US 2013/0146313 A1 Jun. 13, 2013

(51) Int. Cl.
*F16K 15/18* (2006.01)
(52) U.S. Cl.
USPC .............. 137/68.13; 251/68; 251/73; 251/74; 169/61; 169/62; 169/74
(58) Field of Classification Search
USPC ......... 137/68.13, 467; 251/66, 68, 73, 74, 82, 251/83; 169/62, 61
See application file for complete search history.

(56) References Cited

U.S. PATENT DOCUMENTS

| 971,089 | A | * | 9/1910 | Stankiewicz | 169/19 |
|---|---|---|---|---|---|
| 1,061,525 | A | * | 5/1913 | Chase | 137/60 |
| 1,456,723 | A | * | 5/1923 | Derby | 169/19 |
| 1,874,356 | A | * | 8/1932 | Rowley | 137/69 |
| 1,958,143 | A | * | 5/1934 | Howard | 169/23 |
| 2,973,776 | A | * | 3/1961 | Allen | 137/467 |
| 3,089,511 | A | * | 5/1963 | Taylor | 137/456 |
| 3,315,698 | A | * | 4/1967 | Harmes | 137/269 |
| 3,702,623 | A | * | 11/1972 | Chacko | 137/495 |
| 3,744,816 | A | * | 7/1973 | Yamaguchi et al. | 280/737 |
| 3,782,413 | A | * | 1/1974 | Chacko | 137/223 |
| 3,911,940 | A | * | 10/1975 | Johnson | 137/79 |
| 3,991,829 | A | * | 11/1976 | Johnson | 169/19 |
| 4,159,744 | A |  | 7/1979 | Monte et al. |  |
| 4,288,005 | A | * | 9/1981 | Soo-Hoo | 222/5 |
| 4,561,630 | A | * | 12/1985 | McCulloch | 251/84 |
| 4,579,315 | A |  | 4/1986 | Kowalski |  |
| 4,691,736 | A |  | 9/1987 | Kowalski |  |
| 5,009,249 | A | * | 4/1991 | Fisher et al. | 137/495 |
| 5,169,119 | A | * | 12/1992 | Duggal et al. | 251/74 |
| 7,163,186 | B2 | * | 1/2007 | Opper | 251/67 |

(Continued)

FOREIGN PATENT DOCUMENTS

| JP | 3062954 B2 | 7/2000 |
|---|---|---|
| KR | 100319545 B1 | 12/2002 |
| KR | 20080048810 A | 6/2008 |

OTHER PUBLICATIONS

Notice of Preliminary Rejection received from Korean Intellectual Property Office, dated Sep. 30, 2013, for Korean Patent Application No. 10-2012-120343.

(Continued)

*Primary Examiner* — John K Fristoe, Jr.
*Assistant Examiner* — Minh Le
(74) *Attorney, Agent, or Firm* — Kinney & Lange, P.A.

(57) ABSTRACT

A high speed valve has a valve body having a flow passage therethrough, and a poppet disposed within the valve body. The poppet is movable between a first position in which the poppet blocks the flow passage and a second position, and the poppet has a piston connected to a stem at a proximal end of the stem. The valve also has a rotating lever release mechanism adjacent a distal end of the stem.

16 Claims, 5 Drawing Sheets

(56) References Cited

U.S. PATENT DOCUMENTS

| | | |
|---|---|---|
| 7,543,653 B2 * | 6/2009 | Reilly et al. .................... 169/17 |
| 7,635,004 B2 * | 12/2009 | Rudoy et al. .................... 137/70 |
| 7,878,215 B2 | 2/2011 | McLelland et al. |
| 2006/0016608 A1 | 1/2006 | Simpson et al. |
| 2013/0146315 A1 * | 6/2013 | Jarrell et al. .................... 169/16 |

OTHER PUBLICATIONS

The Canadian Office Action mailed Jan. 29, 2014 for Canadian Application No. 2,795,769.

* cited by examiner

HIGH RATE DISCHARGE (HRD) VALVE INCORPORATING A ROTATING LEVER RELEASE MECHANISM

BACKGROUND

This invention relates to a method of and apparatus for the discharge of one or more fire extinguishing agent(s). More particularly, the invention relates to a valve opening mechanism suited to the rapid discharge of fire extinguishing agent(s) and other high mass flow applications.

The invention refers to an apparatus used to rapidly disperse extinguishing agents within a confined space such as the crew compartment of a military vehicle following a fire or explosion event. These automatic fire extinguishing systems (AFES) are deployed after the event has been detected, typically using high speed infrared (IR) and/or ultra violet (UV) sensors. The systems comprise a cylinder filled with extinguishing agent, a fast acting valve and nozzle which enables rapid and efficient deployment of agent throughout the vehicle.

The rapid discharge of a fire extinguishing agent into confined areas of vehicles subsequent to an incident (such as a fuel explosion) is known to suppress the adverse effects experienced by the personnel within the vehicle to survivable levels. Some of the criteria used to determine a survivable event include extinguishing the flame and preventing re-flashing; a reduction in temperature to prevent greater than second degree burns; and the realization of safe levels (i.e. levels up to which personnel can continue to carry out their duties) of overpressure, acid gas, oxygen and concentration of fire extinguishing agent within the vehicle.

A known apparatus for fire extinguishing in such circumstances comprises a generally cylindrical canister which contains a fire extinguishing agent which is pressurized by a gas such as nitrogen. The fire extinguishant agent must be applied rapidly. The outlet for the extinguishant from the canister is typically positioned at the base of the cylinder. A high rate discharge (HRD) valve is operated to allow the discharge of the extinguishing agent. The opening of the valve allows the nitrogen to expand, pushing the extinguishant between it and the valve out through the valve. The orientation of the canister and the location of the outlet in the cylinder allow a high proportion of the extinguishing agent to be discharged rapidly (because the extinguishing agent will be pushed out of the outlet by the nitrogen adjacent the extinguishing agent).

Existing HRD valves, following an actuation, are normally re-furbished away from the vehicle prior to re-use. In certain field conditions this causes logistical and cost issues as both the return of used suppressors and the supply of new or re-furbished hardware to the vehicle is required. In an attempt to minimize this inconvenience, a new design of the HRD valve is being disclosed that can, if required, be disposed of rather than re-furbished. The proposed modified valve may incorporate some common features to the existing valve such as outlet and pressure gauge locations but maintain system efficacy against the fire/explosion challenges.

SUMMARY

In one embodiment, a valve actuation mechanism for a high rate discharge valve has a lever member with a first end and a second end. The mechanism also has a pivot pin attached to the first end of the lever member, and a compression spring that contacts the second end of the lever member.

In another embodiment, a high speed valve has a valve body having a flow passage therethrough, and a poppet disposed within the valve body. The poppet is movable between a first position in which the poppet blocks the flow passage and a second position, and the poppet has a piston connected to a stem at a proximal end of the stem. The valve also has a rotating lever release mechanism adjacent a distal end of the stem.

In yet another embodiment, a fire suppression system is disclosed. The system has a pressure container for holding a fire suppression material connected to a high speed valve. The high speed valve has a valve body having a flow passage therethrough, and a poppet disposed within the valve body. The poppet is movable between a first position in which the poppet blocks the flow passage and a second position, and the poppet has a piston connected to a stem at a proximal end of the stem. The valve also has a rotating lever release mechanism adjacent a distal end of the stem. The system also has a conduit connected to the flow passage of the valve, and a nozzle for dispersing the fire suppression material upon opening of the high speed valve.

DETAILED DESCRIPTION

The present invention is described by the same numbers for like structures throughout the various figures.

Figure 1:
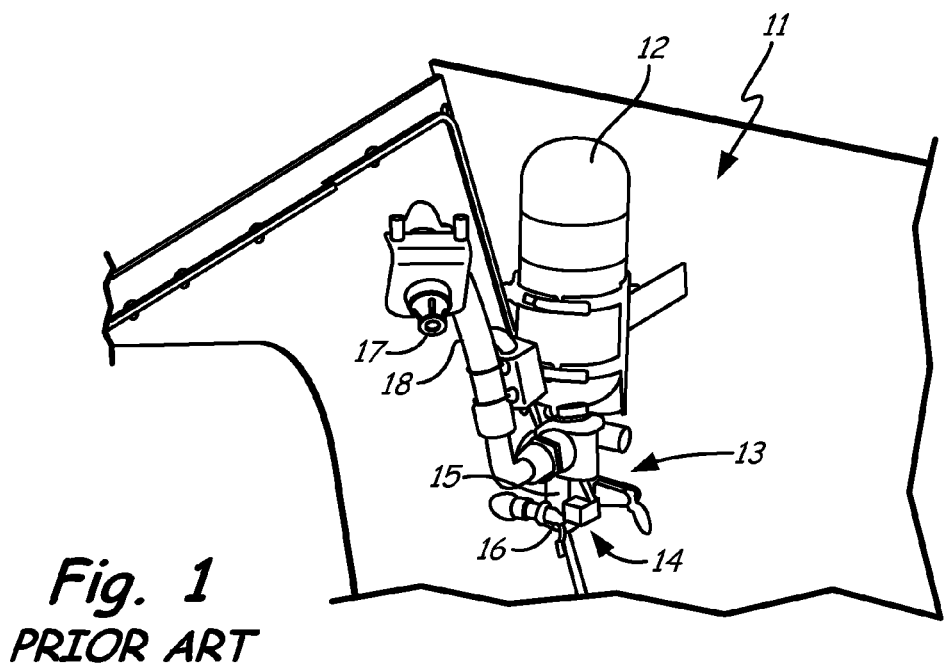
FIG. 1 is a perspective view of prior art apparatus for the discharge of a fire extinguishing agent.

A prior art apparatus 11 for the discharge of a fire extinguishing agent is shown in FIGS. 1-3B. Referring to FIG. 1, apparatus 11 comprises a generally cylindrical canister 12 and a releasing mechanism 13, such as a valve assembly 14 including high rate discharge (HRD) valve 15. The releasing mechanism 13 is opened by solenoid actuator 16. A predetermined mass of fire extinguishing agent is added to the canister 12, which is then super-pressurized with nitrogen. Canister 12 is made from steel or a similarly high strength, rigid material to contain the pressurized extinguishing agent.

When the releasing mechanism 13 is opened the fire extinguishing agent discharges from the canister 12 in a fraction of a second. Canister 12 is usually fitted vertically (that is with its longitudinal axis extending vertically), or as close to vertical as possible, within an enclosed or confined area of a vehicle. In order for the fire extinguishing agent to be distributed homogenously within the confined area without adversely impacting the personnel or equipment contained therein, an outlet nozzle 17 needs to be extended to the highest point thereof, such as where the walls meet the roof. This is achieved in the apparatus 11 by connecting the nozzle 17 to the releasing mechanism 13 via conduit 18, such an appropriate length of hose or pipe.

The vertical orientation of the canister 12 allows releasing mechanism 13 at the outlet of canister 12 to be located at the lowest point. In one embodiment, the fire extinguishant lies at the base of canister 12 (due to its relatively high density), with the nitrogen or a similar fluid pressurizing the space above. When the releasing mechanism 13 is opened, the pressurizing fluid expands and rapidly forces the extinguishant through HRD valve 15, along conduit 18 and out nozzle 17.

When the fire extinguishing agent is super-pressurized by pressurized fluid within canister 12, a proportion of the fluid dissolves into the fire extinguishant. When HRD valve 15 is operated to deploy the fire extinguishant agent, the rapid expansion of gas dissolved within the fire extinguishing agent causes turbulence within canister 12, which forms a two phase mixture of liquid extinguishing agent and pressurizing fluid, and a foam or mousse is formed.

Figure 2:
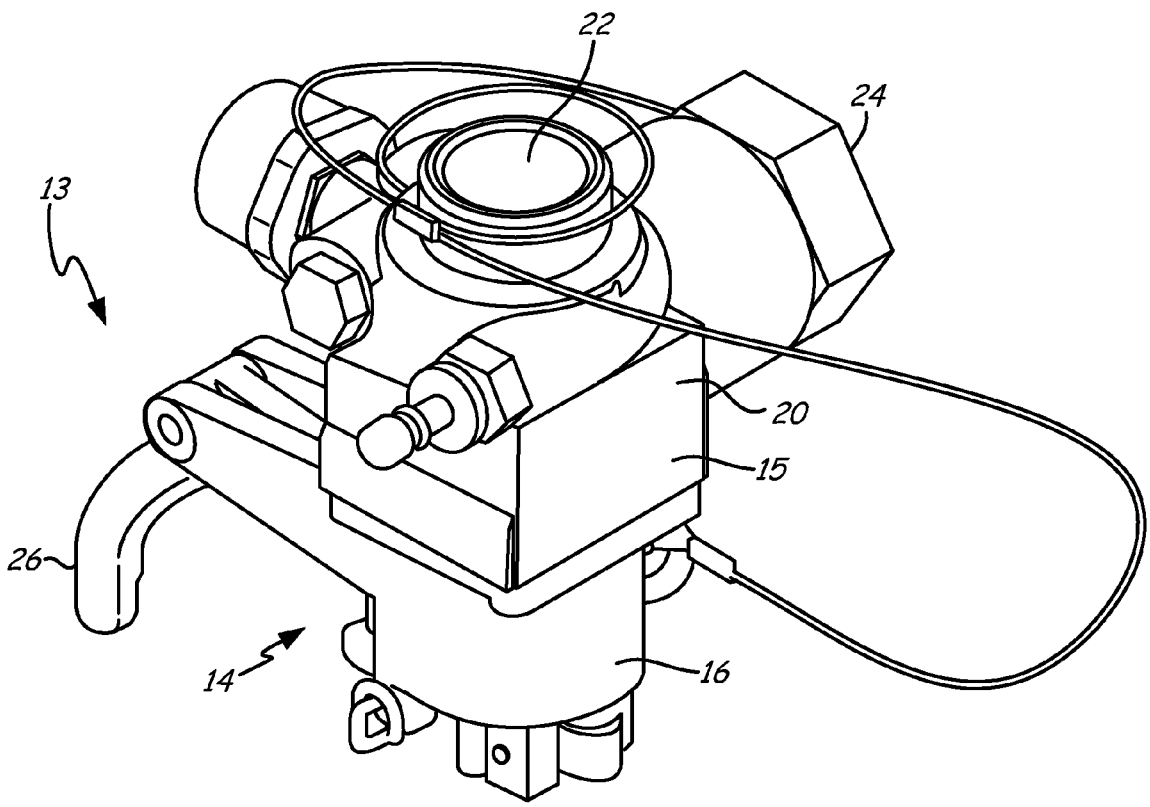
FIG. 2 is a perspective view of a prior art high rate discharge (HRD) valve.
Figure 3B:
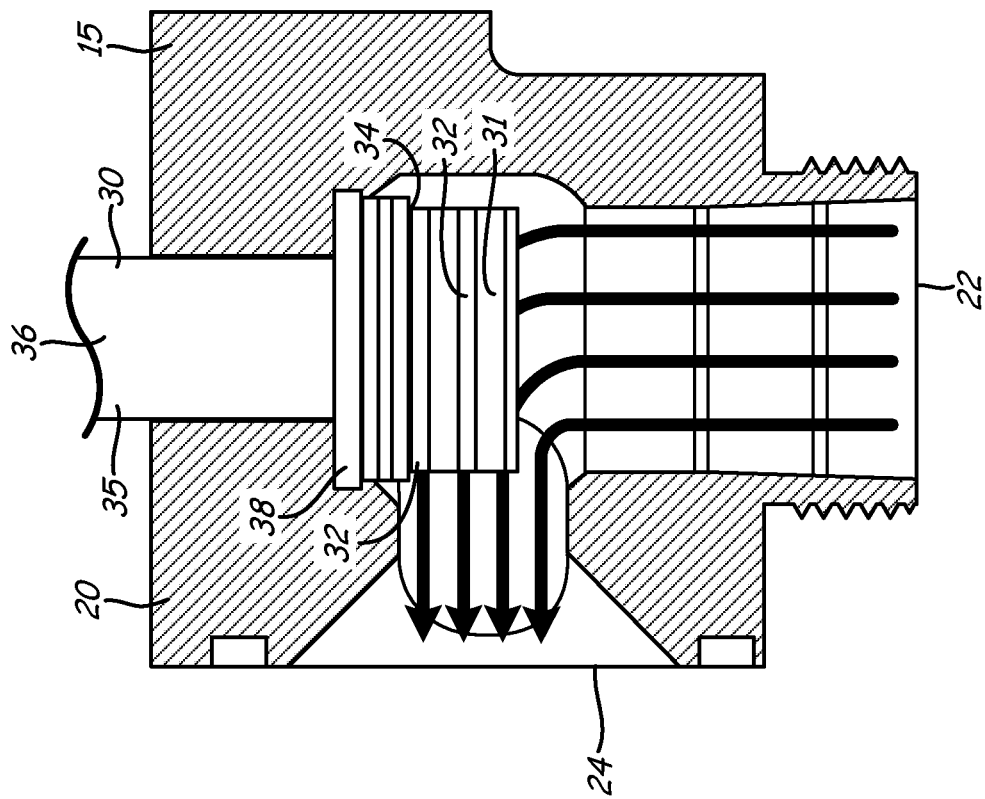
FIG. 3B is a cross-sectional view of the prior art HRD valve in the open position.
Figure 3A:
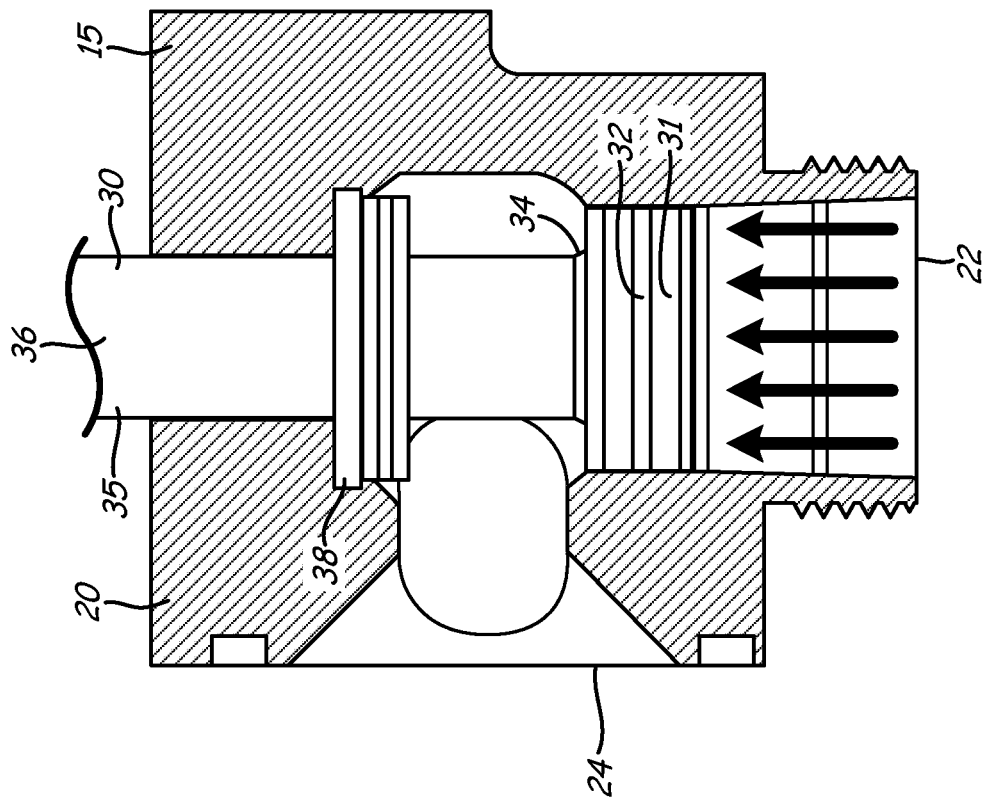
FIG. 3A is a cross-sectional view of the prior art HRD valve in the closed position.

FIG. 2 is a perspective view of a prior art high rate discharge (HRD) valve 15. Valve 15 contains hollow body 20 with an elongate bore on a vertical axis that terminates with an opening that forms inlet 22. Hollow body 20 has an enlarged central cavity (as seen in FIGS. 3A and 3B) that communicates laterally with discharge outlet 24. The body of valve 15 is constructed from a metal alloy, or similarly rigid material. Valve 15 also contains mechanical override 26, as well as solenoid 16 for actuating the internal regulating mechanisms of valve 15.

FIGS. 3A and 3B illustrate the internal workings of valve 15. The main operating and regulating mechanism of valve 15 is poppet 30. Poppet 30 is used to close the entrance to an opening in the body of valve 15. Poppet 30 contains a piston 31 at proximate end 34, connected to stem 35 that terminates at distal end 36 adjacent actuating mechanisms, such as mechanical override 26 and solenoid 16. Poppet 30 is constructed from a material the same as or similar to that of body 20 of valve 15. Poppet 30 and stem 35 may be of various geometries, such as circular, oval, or polygonal in cross section so long as they match corresponding valve structures, such as the bore opening of inlet 22. In one embodiment, poppet 30 is generally cylindrical, as is stem 35 that is centrally aligned with poppet 30.

One or more annular grooves in piston 31 contain o-rings 32 which compress against the bore of valve 15, providing a seal. O-rings 32 are fabricated from rubber, or a similar elastomeric polymer capable of creating an air-tight seal between poppet 30 and body 20. Pressure inside canister 12 (illustrated in FIG. 1) pushes against proximate end 34 of poppet 30, forcing poppet 30 upward while constraining seals 32 against inlet 22 and canister 12. Once poppet 30 is released, pressurized fluid contained inside canister 12 moves poppet 30 allowing the fluid to escape through outlet 24. An elastomeric bumper 38 quiets the operation and prevents damage to poppet 30 and valve body 20. Following the actuation of the valve via the release mechanism, typically a collet connected to solenoid 16 with mechanical override 26 consisting of a linkage assembly, poppet 30 slides to the open position allowing pressurized fluid, such as a fire extinguishant, to flow out of outlet 24. The use of this common valve body 20 and poppet 30 arrangement allows for high mass flow rates through the valve 15.

Figure 4:
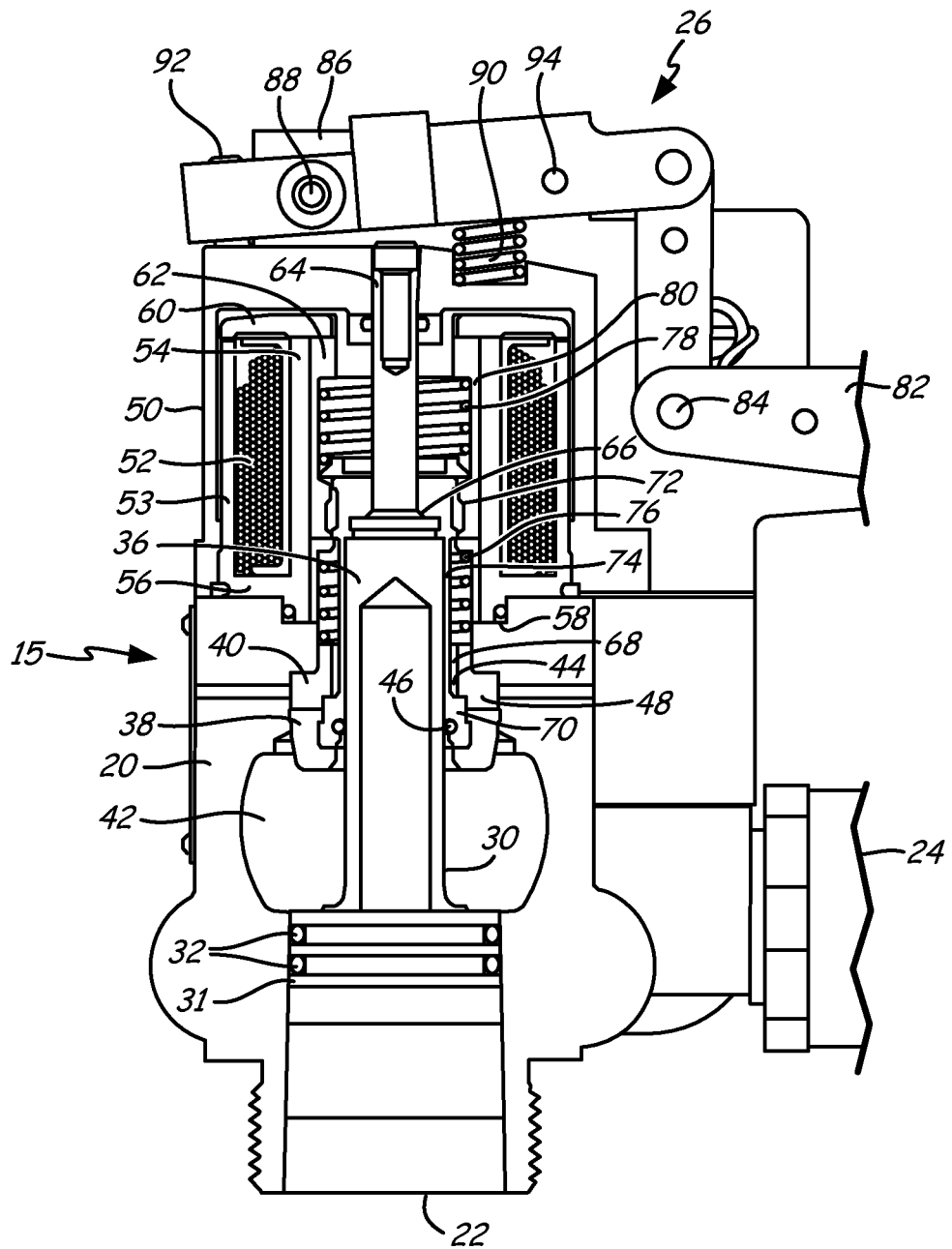
FIG. 4 is a cross-sectional view of the prior art HRD valve with a collet, poppet, and solenoid release mechanism.

Referring now to FIG. 4, valve 15 of FIG. 1 has body 20 having elongated bore 40 on a vertical axis, upon which inlet 22 of the system upstream chamber is centered. Bore 40 is characterized by an enlarged generally central downstream chamber cavity 42 which communicates laterally with large discharge port 24. Between the upstream and downstream chambers, a smooth cylindrical land 44 receives and supports the cylindrical piston 31 of the valve member poppet 30, and separate elastomeric o-rings 32 in two spaced circumferential grooves of piston 31 establish redundant sealing of pressurized suppressant fluid from the canister 12 (see FIG. 1) when piston 31 is in its normally closed position, as shown. Bore 40 is on an axis that is counterbored to provide locating shoulders for bumper 38, which is a flange bushing of elastomeric material. The annular base ring of a collet 46 locates at a shoulder in bushing 48 and provides radial-piloting support for an elongate cylindrical surface of stem 35, shown integrally formed with piston 30.

Body 20 is effectively extended by a cupped end-housing member 50, bolted thereto and defining a cavity for containment and coaxial location of a solenoid winding 52, and a generally toroidal core associated therewith. The core is of magnetic flux-conducting material of high permeability, and the core is seen to comprise inner and outer concentric annular legs 53, 54 integrally connected by an upper radially extending annular leg 56, and concentrically fitted at to counterbore 58 in the bottom face of body 20. The toroidal flux path of the solenoid is completed via short air gaps between lower ends of legs 53, 54 and an annular armature plate 60, which derives axially slidable support from a sleeve-like armature stem 62, piloting on the cylindrical bore of the inner core leg 53. The reduced lower end of stem 35 pilots on a central bore 64 in the bottom-closure wall of end housing 50.

To retain the mechanically latched valve-closed position shown in FIG. 4, stem 35 is locally reduced at 66 to define a radially short but circumferentially continuous shoulder, having preferably a slope α in the order of 10° to a strictly radial plane, for cam purposes; and collet 46 is characterized by an angularly distributed plurality of elongate collet fingers 68. Each collet finger 68 has an enlarged end 70 which is radially displaceable by reason of compliant flexibility along the length of each finger 68. Inner contouring of each collet end is characterized by a heel of slope α and engaged to the stem shoulder (adjacent reduction 66) when the collet end 70 is radially inwardly confined. A short sleeve 72, which is a slidable bushing on the bore of inner core leg 53, is shown positioned to provide such confinement, thereby preventing high pressure on the upstream side of poppet 30 from driving poppet 30 out of the normally closed position shown. A first coil spring 74, compressed between bushing 72 and a slidable ring 76, is retained in compressed condition by ring 76 abutment with radially outward shoulder portions of all collet ends 70, and sleeve 72 is poised for axially upward driving abutment with ring 76, relieving the same from shoulder abutment with collet ends 70, upon solenoid actuation. A second coil spring 78 is compressed between a shoulder of armature sleeve 80 and the lower finger ends of the collet, to assure against inadvertent opening of the valve in response to mechanical shock.

Solenoid actuation typically involves excitation of winding 52 upon development of an output signal by an explosion detector (not shown). Solenoid winding excitation causes armature plate 60 to close gaps to core legs 53, 54, thus driving sleeve 80 to downwardly displace sleeve 72 with respect to collet ends 70. By reason of this displacement, upper and lower lands in the bore of sleeve 72 are no longer positioned to retain collet ends 70 in radially inward confinement, so that collet ends 70 may radially outwardly shift in quick response to axially upward gas-pressurized force on poppet 30 (aided by outward cam action via the engaged slopes α), thus freeing poppet 30 for gas-powered ascent and impact with bumper 38. The valve is immediately opened and depressant gas discharged laterally via port 24. With this prior art valve, the solenoid requires several amps to operate and as a consequence is quite bulky, heavy, and expensive.

It has been generally indicated that external mechanism 26 provides a manually or otherwise actuated release of the latch action between sleeve 72 and collet ends 70. More specifically, end housing 50 is shown to integrally include side arm 82 for pinned support (at 84) of mechanism 26, as well as integral lugs or trunnion 86 for pinned support (at 88) of mechanism. A compressed spring 90 constantly urges mechanism to the position shown in FIG. 4, the same being limited by a tail stop 92 on mechanism 26. A transverse hole 94 in mechanism 26, laterally outward of spring 90, provides access for reception of a locking pin (see FIG. 2) that prevents release of mechanism 26.

Figure 5:
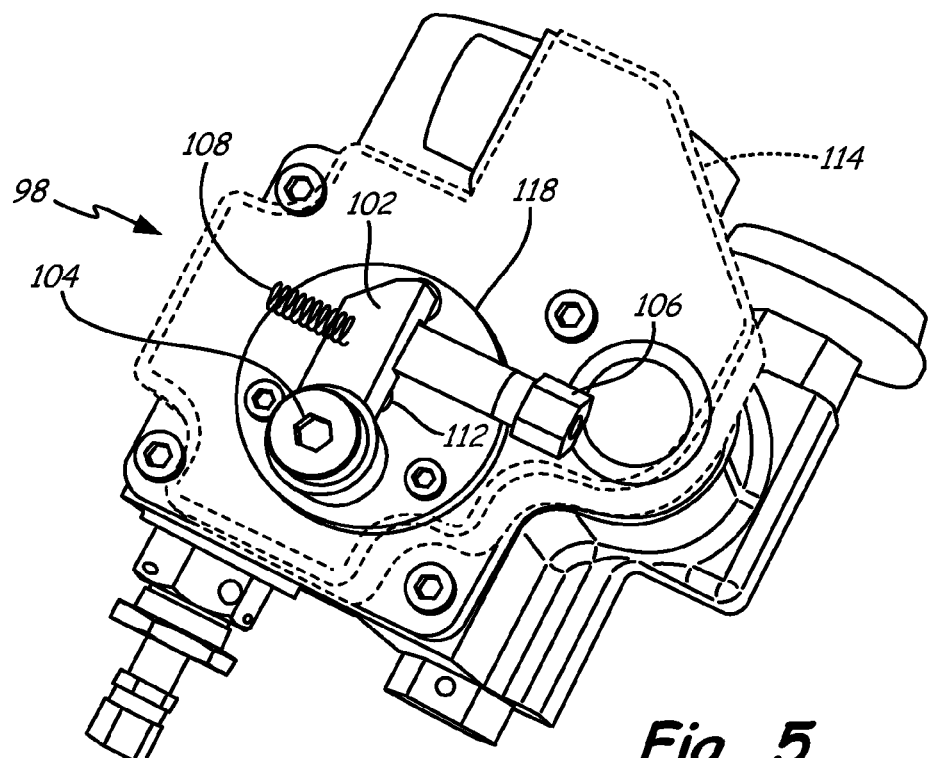
FIG. 5 is a perspective view of the HRD valve with a rotating lever release mechanism.
Figure 6:
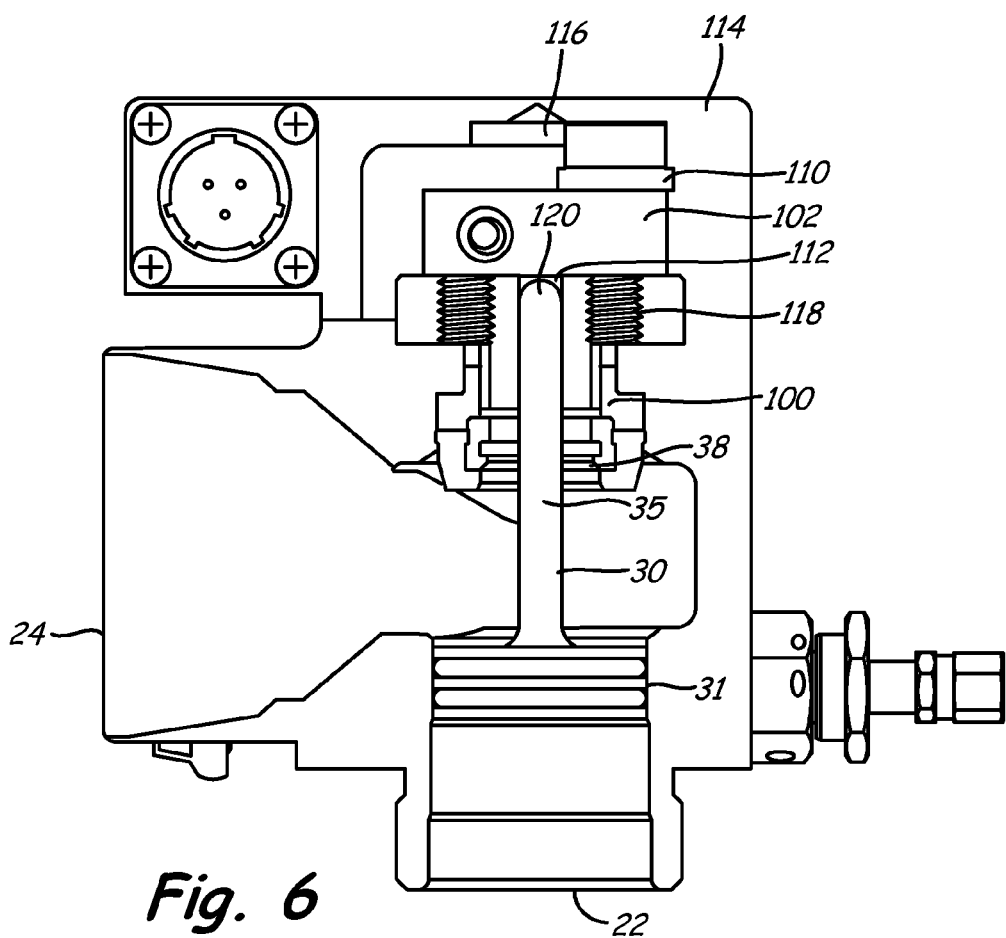
FIG. 6 is a cross-sectional view of the HRD valve with the rotating lever release mechanism.

FIGS. 5-7B illustrate a new HRD valve design. FIG. 5 is a perspective view of the HRD valve with rotating lever release mechanism 98, and FIG. 6 is a cross-sectional view of the HRD valve with rotating lever release mechanism 98. The new valve design utilizes the same body 20, poppet 30, bumper 38, inlet 22, and outlet 24 design as the prior art shown in FIGS. 1-4, and uses several of the same or similar internal assembly components. A new rotating lever release mechanism 98 is provided. Mechanism 98 has lever 102, pivot 104, initiator 106, and spring 108 attached to holding assembly 118. In the closed position, lever 102 covers outlet hole 112 that acts as a guide for stem 35 of poppet 30. Mechanism 98 is covered by valve cap 114, which is a housing constructed of a rigid material. In one embodiment, bushing 110 holds lever 102 in place with respect to valve cap 114 and holding assembly 118. The original collet has been cut in length for this design and support ring 100 is included in its place. This allows for a retrofit of existing valves after actuation of the valves.

Figure 7A:
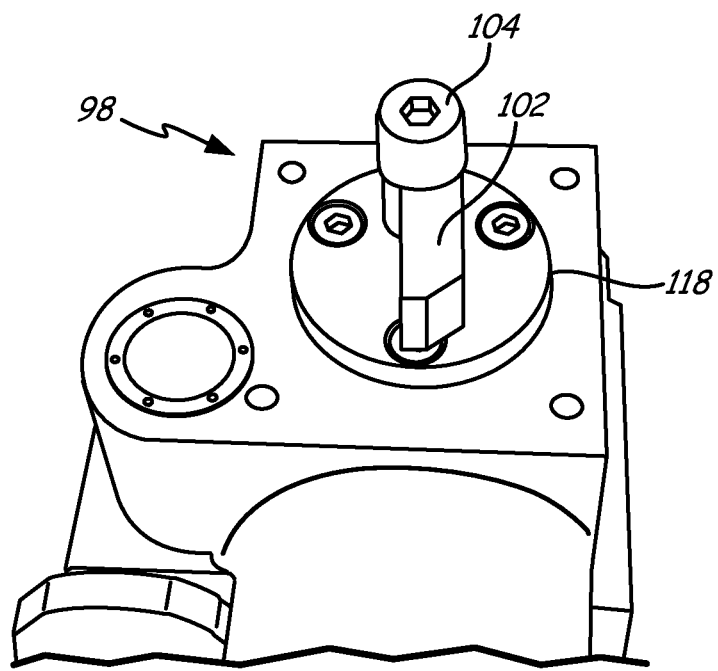
FIG. 7A is a perspective view of a top portion of the HRD valve in the closed position.
Figure 7B:
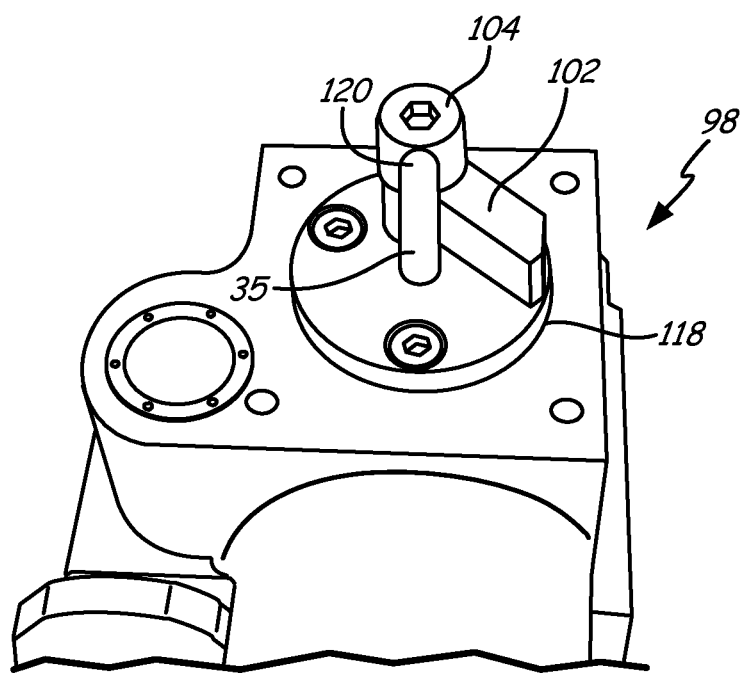
FIG. 7B is a perspective view of a top portion of the HRD valve in the open position.

FIG. 7A is a perspective view of a top portion of the HRD valve in the closed position, and FIG. 7B is a perspective view of a top portion of the HRD valve in the open position. Prior to actuation, poppet 30 is held in place by lever 102 which covers exit hole 112 that allows stem 35 to move up into valve cap 114 area. Lever 102 is hinged at a first end via shoulder screw assembly that acts as pivot 104 mounted to one side of the poppet stem outlet hole 112. In the closed position, lever 102 is held in place by compression spring 108 pushing against electric initiator 106 at a second end of lever 102. Spring 108 prevents movement of lever 102 due to vibration or shock loads. Electric initiator 106 is a protractor, such as a Metron™ actuator DR2000 series supplied by Chemring Group PLC. The mode of operation for electric initiator 106 devices is to rapidly eject a pin (not shown) typically between 6 mm and 15 mm with a work output of between 4.9 J and 15 J. The pin hits lever 102 as it ejects and overcomes the combined force of opposing compression spring 108 and the friction from the top of stem 35, which is forced onto lever 102 by the pressure within the extinguisher canister 12. Pivot 104 allows for the rotation of lever 102 about an axis that is parallel to the axis of stem 35 of poppet 30, which is centrally located within the valve body.

The friction between top end 120 of stem 35 of poppet 30 and lever 102 interface may be minimized by making the profile of top end 120 rounded into a hemisphere. In addition, lever 102 may be hardened to prevent rounded surface of top end 120 from pitting the contact surface of lever 102. As the pin within electric initiator 106 ejects lever 102, it is pushed away from stem 35 until top end 120 of stem 35 is completely uncovered, thus allowing stem 35 and the rest of poppet 30 to move upwards into valve cap 114. Relief 116 may be provided in valve cap 114 to allow full motion of poppet 30 to allow piston 31 to contact bumper 38. Poppet 30 is then free to move to its open position resting against bumper 38 shown in FIG. 3A.

The valve can either be disposed of following one operation, or reset by removing electric initiator 106, pushing poppet 30 back into place, then sliding lever 102 back into position. A new electric initiator 106 re-sets the location of lever 102 to the correct position. This invention utilizes many of the same components used in an existing valve design, which allows for the formation of a replaceable valve assembly. The current rotating lever release mechanism 98 provides a saving in both mass and space claim when compared to the prior art. In addition, electric actuator 106 requires less power to operate, which when combined with the significantly less expensive valve design, provides for a lower overall system cost. Alternatively, rotating lever release mechanism 98 valves could be retrofitted in place of the prior art design with minimal changes required to the previously installed system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A valve actuation mechanism for a high rate discharge valve, comprising:
   a lever member with a first end and a second end;
   a pivot pin attached to the first end of the lever member, the pivot pin having a pivot pin axis; and
   a compression spring that contacts the second end of the lever member, wherein the load of the compression spring is perpendicular to the pin axis; and
   wherein the mechanism is attached to a valve body of the valve having a flow passage therethrough; and wherein the valve further comprises:
   a poppet disposed within the valve body, the poppet movable between a first position in which the poppet blocks the flow passage and a second position, the poppet containing a piston connected to a stem at a proximal end of the stem;
   wherein the pivot pin axis is parallel to an axis of the stem.

2. The valve actuation mechanism of claim 1, wherein the distal end of the stem is hemispherical.

3. The valve actuation mechanism of claim 2, further comprising:
   an actuating mechanism for rotating the lever member between a first position and a second position.

4. The valve actuation mechanism of claim 3, wherein the actuating mechanism is an electronic protractor.

5. The valve actuation mechanism of claim 1 wherein the lever member, spring, and pivot pin are connected to an outer surface of the valve body.

6. A high speed valve, comprising:
   a valve body having a flow passage therethrough;
   a poppet disposed within the valve body, the poppet movable between a first position in which the poppet blocks the flow passage and a second position, the poppet containing a piston connected to a stem at a proximal end of the stem, wherein the stem contains a stem axis; and a lever release mechanism adjacent a distal end of the stem, wherein the lever release mechanism rotates about an axis parallel to the stem axis.

7. The high speed valve of claim 6, wherein the rotating lever release mechanism comprises:
   a lever member with a first end and a second end;
   a pivot pin attached to the first end of the lever member; and
   a compression spring that contacts the second end of the lever member.

8. The high speed valve of claim 7, wherein the pivot pin is on an axis that is parallel to the stem axis.

9. The high speed valve of claim 7, wherein the distal end of the stem is hemispherical.

10. The high speed valve of claim 9, further comprising:
    an actuating mechanism for rotating the release mechanism between a first position and a second position.

11. The high speed valve of claim 10, wherein the actuating mechanism is an electronic protractor.

12. The high speed valve of claim 6 wherein the rotating lever release mechanism is connected to an outer surface of the valve body.

13. A fire suppression system, the system comprising:
    a pressure container for holding a fire suppression material;
    a high speed valve connected to the container comprising:
       a valve body having a flow passage therethrough;
       a poppet disposed within the valve body, the poppet movable between a first position in which the poppet blocks the flow passage and a second position, the poppet containing a piston connected to a stem at a proximal end of the stem, wherein the stem contains a stem axis; and
       a lever release mechanism adjacent a distal end of the stem, wherein the lever release mechanism rotates about an axis parallel to the stem axis;
    a conduit connected to the flow passage of the valve; and
    a nozzle for dispersing the fire suppression material upon opening of the high speed valve.

14. The fire suppression system of claim 13, wherein the rotating lever release mechanism comprises:
    a pivot pin;
    a lever member with a first end and a second end attached to the pivot pin at the first end of the lever member; and
    a compression spring that contacts the second end of the lever member.

15. The fire suppression system of claim 14, further comprising:
    an actuating mechanism for rotating the release mechanism between a first position and a second position.

16. The fire suppression system of claim 13, wherein the distal end of the stem is hemispherical.

* * * * *